(12) United States Patent
Wang et al.

(10) Patent No.: US 9,448,990 B2
(45) Date of Patent: *Sep. 20, 2016

(54) ADAPTIVE CONSTRUCTION OF A STATISTICAL LANGUAGE MODEL

(71) Applicant: Microsoft Corporation, Redmond, WA (US)

(72) Inventors: Kuansan Wang, Bellevue, WA (US); Xiaolong Li, Sammamish, WA (US); Jiangbo Miao, Redmond, WA (US); Frederic H. Behr, Jr., Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/072,752

(22) Filed: Nov. 5, 2013

(65) Prior Publication Data

US 2014/0149108 A1    May 29, 2014

Related U.S. Application Data

(63) Continuation of application No. 12/684,749, filed on Jan. 8, 2010, now Pat. No. 8,577,670.

(51) Int. Cl.
*G06F 17/27* (2006.01)
*G06F 17/30* (2006.01)
*G10L 15/183* (2013.01)

(52) U.S. Cl.
CPC ......... *G06F 17/2715* (2013.01); *G06F 17/277* (2013.01); *G06F 17/30864* (2013.01); *G10L 15/183* (2013.01)

(58) Field of Classification Search
CPC . G10L 15/197; G10L 15/183; G10L 15/193; G10L 15/187; G10L 15/1815; G10L 15/005; G10L 15/06; G10L 2015/088; G10L 15/144; G10L 2015/228

USPC ............ 704/1–10, 251, 255, 257, 270, 250, 704/277; 1/1
See application file for complete search history.

(56) References Cited

U.S. PATENT DOCUMENTS 6,418,431 B1 *   7/2002   Mahajan et al.
7,254,529 B2 *   8/2007   Gao et al. ......................... 704/9

(Continued)

OTHER PUBLICATIONS

Brants, et al., "Large Language Models in Machine Translation", Retrieved at <<http://acl.ldc.upenn.edu/D/D07/D07-1090.pdf>>, Proceedings of the 2007 Joint Conference on Empirical Methods in Natural Language Processing and Computational Natural Language Learning, Jun. 2007, pp. 858-867.

(Continued)

*Primary Examiner* — Huyen Vo
(74) *Attorney, Agent, or Firm* — Dave Ream; Tom Wong; Micky Minhas

(57) ABSTRACT

A statistical language model (SLM) may be iteratively refined by considering N-gram counts in new data, and blending the information contained in the new data with the existing SLM. A first group of documents is evaluated to determine the probabilities associated with the different N-grams observed in the documents. An SLM is constructed based on these probabilities. A second group of documents is then evaluated to determine the probabilities associated with each N-gram in that second group. The existing SLM is then evaluated to determine how well it explains the probabilities in the second group of documents, and a weighting parameter is calculated from that evaluation. Using the weighting parameter, a new SLM is then constructed as a weighted average of the existing SLM and the new probabilities.

20 Claims, 4 Drawing Sheets

(56) References Cited

U.S. PATENT DOCUMENTS

| 7,580,926 | B2 | 8/2009 | Kapur et al. |
|---|---|---|---|
| 2006/0212288 | A1 | 9/2006 | Sethy et al. |
| 2009/0234878 | A1 | 9/2009 | Herz et al. |
| 2011/0231394 | A1 | 9/2011 | Wang et al. |

OTHER PUBLICATIONS

"N-gram", Retrieved at, <<http://en.wikipedia.org/wiki/N-gram>>, last modified Oct. 5, 2009, 5 pages.

Franz,et al., "All Our N-gram are Belong to You", Retrieved at <<http://googleresearch.blogspot.com/2006/08/all-our-n-gram-are-belong-to-you.html>>, Aug. 3, 2006, 5 pages.

Carlson, et al., "Memory-Based Context-Sensitive Spelling Correction at Web Scale", Retrieved at <<http://www.cs.cmu.edu/~acarlson/papers/carlson-icmla-07.pdf>>, Proceedings of the Sixth International Conference on Machine Learning and Applications, Dec. 13-15, 2007, 6 pages.

Rosenfeld, Ronald, "Adaptive Statistical Language Modeling: A Maximum Entropy Approach", Retrieved at <<http://www.cs.cmu.edu/~roni/papers/me-thesis-TR-94-138.pdf>>, Apr. 19, 1994, 114 pages.

Masataki, et al., "Task Adaptation Using Map Estimation in N-Gram Language Modeling", Retrieved at <<http://ieeexplore.ieee.org/stamp/stamp.jsp?arnumber=00596042>>, in 1997 IEEE International Conference on Acoustics, Speech, and Signal Processing (ICASSP'97), Apr. 21-24, 1997, pp. 783-786.

Bacchiani, et al., "Language Model Adaptation with MAP Estimation and the Perceptron Algorithm", Retrieved at <<http://www.aclweb.org/anthology/N/N04/N04-4006.pdf>>, In Human Language Technology Conference-North American Chapter of the Association for Computational Linguistics Annual Meeting (HLT-NAACL), dated 2004, 4 pages.

Shannon, C. E., "A Mathematical Theory of Communication", Retrieved at, <<http://www.dna.caltech.edu/courses/cs129/caltech_restricted/shannon1948.pdf>>, The Bell System Technical Journal, Jul., Oct., 1948, pp. 1-55.

Rosenfeld, Ronald, "Two Decades of Statistical Language Modeling: Where Do We Go From Here?", Retrieved at <<http://www.cs.cmu.edu/~roni/papers/survey-slm-IEEE-PROC-0004.pdf>>, Proceedings of the IEEE, Aug. 2000, vol. 88, Issue 8, 9 pages.

Clarkson, et al., "Statistical Language Modeling Using the CMU-Cambridge Toolkit", Retrieved at <<http://www.cs.cmu.edu/~roni/papers/SLM-TK-V2-eurospeech-97.pdf>>, in Eurospeech 1997, dated 1997, 4 pages, Rhodes, Greece.

Hsu, et al., "Iterative Language Model Estimation: Efficient Data Structure and Algorithms", Retrieved at <<http://people.csail.mit.edu/bohsu/IterativeLanguageModelEstimation2008.pdf>>, in Proc. of 9th Annual Conference of the International Speech Communication Association (Interspeech 2008), Sep. 22-26, 2008, 4 pages, Brisbane, Australia.

Stolcke, Andreas, "SRILM—An Extensible Language Modeling Toolkit", 7th International Conference on Spoken Language Processing (ICSLP 2002), Sep. 16-20, 2002, 4 pages.

Chen, et al., "An Empirical Study of Smoothing Techniques for Language Modeling", Retrieved at <<http://research.microsoft.com/en-us/um/people/joshuago/tr-10-98.pdf>>, Proceedings of the 34th annual meeting on Association for Computational Linguistics, Aug. 1998, pp. 1-63.

Nguyen, et al., "MSRLM: A Scalable Language Modeling Toolkit", Retrieved at <<http://research.microsoft.com/pubs/70505/tr-2007-144.pdf>> Nov. 2007, 19 pages.

Wang, Kuansan, "Semantic Synchronous Understanding for Robust Spoken Language Applications", Retrieved at <<http://research.microsoft.com/pubs/77494/2003-kuansan-asru.pdf>>, IEEE Workshop on Automatic Speech Recognition and Understanding, 2003. ASRU apos;03. 2003 , Nov. 30-Dec. 3, 2003, pp. 640-645.

Bellegarda, Jerome R., "Statistical Language Model Adaptation: Review and Perspective", Retrieved at <<http://www.is.cs.cmu.edu/11-751/attachment/wiki/WikiStart/Bellegarda_2004.pdf?format=raw>>, Speech Communication, vol. 42, No. 1., Jan. 2004, pp. 93-108.

Suzuki, et al., "A Comparative Study on Language Model Adaptation Techniques Using New Evaluation Metrics", Retrieved at, <<http://delivery.acm.org/10.1145/1230000/1220609/p265-suzuki.pdf?key1=1220609&key2=3448184521&coll=GUIDE&dl=GUIDE&CFID=56332671&CFTOKEN=44503479>>, Proceedings of the conference on Human Language Technology and Empirical Methods in Natural Language Processing, Oct. 6-8, 2005, pp. 265-272.

Tur, et al., "Unsupervised Language Model Adaptation for Meeting Recognition", Retrieved at <<www.speech.sri.com/papers/icassp2007-lm-adapt.ps.gz>>, IEEE International Conference on Acoustics, Speech and Signal Processing, 2007 (ICASSP 2007), vol. 4, Apr. 15-20, 2007, 4 pages.

Liu, et al., "Context Dependent Language Model Adaptation", Retrieved at <<http://svr-www.eng.cam.ac.uk/~mjfg/liu_INTER08.pdf>>, in Proc. of 9th Annual Conference of the International Speech Communication Association (Interspeech 2008), Sep. 22-26, 2008, 4 pages, Brisbane, Australia.

Goodman, et al., "Language Model Size Reduction by Pruning and Clustering", Retrieved at <<research.microsoft.com/en-us/um/people/.../icslp-really-final.ps>>, Sixth International Conference on Spoken Language Processing (ICSLP 2000), Oct. 16-20, 2000, pp. 5, Beijing, China.

Bulyko, et al., "Web Resources for Language Modeling in Conversational Speech Recognition", Retrieved at <<http://delivery.acm.org/10.1145/1330000/1322392/a1-bulyko.pdf?key1=1322392&key2=3068184521&coll=GUIDE&dl=GUIDE&CFID=56332992&CFTOKEN=82122629>>, ACM Transactions on Speech and Language Processing, vol. 5, Issue 1, Dec. 2007, 25 pages.

\* cited by examiner

FIG. 2

Statistical language model 202

| | |
|---|---|
| deterministic finite automata | 0.00007 |
| probability density function | 0.00012 |
| motor vehicle bureau | 0.00071 |
| motor vehicle department | 0.00082 |
| motor vehicle office | 0.00053 |
| stand up comedy | 0.00106 |
| ⋮ | ⋮ |

Blend new information

New probabilities 206

| | |
|---|---|
| mad cow disease | 0.00007 |
| motor vehicle bureau | 0.00012 |
| motor vehicle office | 0.00071 |
| stand up comedy | 0.00082 |
| ⋮ | ⋮ |

Newly analyzed set of documents 204

ADAPTIVE CONSTRUCTION OF A STATISTICAL LANGUAGE MODEL

CROSS-REFERENCE

This is a continuation of U.S. patent application Ser. No. 12/684,749, entitled "Adaptive Construction of a Statistical Language Model", filed Jan. 8, 2010 (U.S. Pat. No. 8,577,670).

BACKGROUND

A statistical language model (SLM) has many applications in natural language processing. Some examples of these applications are information retrieval, speech recognition, and natural language translation. A typical SLM assigns probabilities to N-grams. An N-gram is a sequence of N words, where N is some fixed number: e.g., a 3-gram (sometimes written "trigram") is a sequence of three consecutive words. An SLM can use any value for N. In the example where the SLM uses 3-grams, the SLM assigns probabilities to specific sequences of three words.

The probabilities that the SLM assigns to each N-gram describe the likelihood that the N-gram will appear in some corpus of natural language material. For example, the phrase "motor vehicle department" is a trigram. It may be determined from an analysis of some large body of English-language text that 0.018% of all trigrams are the phrase "motor vehicle department." In that case, an SLM may assign the probability 0.00018 to that trigram. What this probability implies is that, if one were to choose a random trigram from English text, there is a probability of 0.00018 that the randomly-selected trigram would be the phrase "motor vehicle department."

SLMs are often built to model web documents. Such SLMs can be used in various search applications. However, there are two issues that arise in building an SLM from web. First, the volume of web documents is large. Building an SLM normally involves counting how many times each trigram appears in a corpus of documents, and calculating the proportion of each trigram's count to the total number of trigrams. This process assumes that one can examine the entire corpus at once. But due to the size of the web, it is infeasible to examine all web documents at once. Second, web content is constantly changing, so an SLM that is built from the web may quickly become obsolete.

SUMMARY

An SLM may be built from some portion of documents, and then the SLM may be continually refined based on additional documents. For example, an SLM may be built using one group of documents. This SLM assigns a probability to each N-gram that occurs in that group (and the SLM may be "smoothed" to assign non-zero probabilities even to N-grams that have not been encountered). At some later time, a second group of documents is analyzed to determine its N-gram counts. The N-gram counts from the second group are then blended with the initial SLM to form a new SLM. For example, analysis of the second group of documents may reveal N-grams that did not occur at all in the first group of documents. Or, the second group of documents may contain some of the N-grams from the first group, but the rate at which a particular N-gram occurs in the second group may be different from the first. Thus, when the existing SLM is blended with data from the newly-examined set of documents, the result is a new SLM that contains a new set of probabilities, which reflect the combined influence of both the original probabilities in the initial SLM and the new N-gram counts. The process may be performed iteratively. For example, if a third group of documents is examined, the occurrence of N-gram counts in this third group may be counted, and the new count information may be blended with the "new" SLM mentioned above to form another new SLM. In general, the $i^{th}$ SLM may be blended with new data to form the $(i+1)^{th}$ SLM.

One way to perform the blending is to calculate the posterior probability of the current SLM, in view of the N-grams observed in a newly-evaluated group of documents—in effect the probability that the current SLM is correct in view of the newly-observed data. For example, the last SLM that was calculated might assign some probability (e.g., 0.00018) to the trigram "motor vehicle department." If a new group of documents is examined, the trigram "motor vehicle department" might occur in those documents with a probability of 0.00022. Other trigrams may have one probability in the current SLM, and another probability in the newly-examined set of documents. By comparing the occurrence of trigrams in the newly-examined documents with current SLM's prediction of how often those trigrams will occur, it is possible to determine how well the current SLM predicts the occurrence of trigrams in the new set of documents. This quality of prediction can be assigned a number, $\pi$. The blending of the current SLM with the new data can be done by taking the weighted average of the current SLM and the new data, where the current SLM is weighted by $\pi$, and the new data is weighted by $1-\pi$. For example, if the current SLM perfectly predicts the occurrence of N-grams in the newly-examined documents, then $\pi=1.0$ and $1-\pi=0.0$, in which case the new SLM would be the same as the old SLM. At the other extreme, if the current SLM cannot predict the occurrence of N-grams in the new documents at all, then $\pi$ approaches 0.0 and $1-\pi$ approaches 1.0, in which case the current SLM is effectively discarded, and a new SLM would be created based entirely on the count of N-grams in the newly-examined documents. Typically, $\pi$ is somewhere between 0.0 and 1.0, so the new SLM is based partly on the current SLM, and partly on new data.

In one example, a web crawler examines some portion of the web every day. As new portions of the web are examined, the process described above is applied to blend an existing SLM with new data to produce a new SLM. In this way, the SLM is continually modified to reflect all of the documents in the web, and also to reflect changes in the content of the web over time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2 is a block diagram of an example statistical language model (SLM), and of the blending of the SLM with new data.

DETAILED DESCRIPTION

Figure 1:
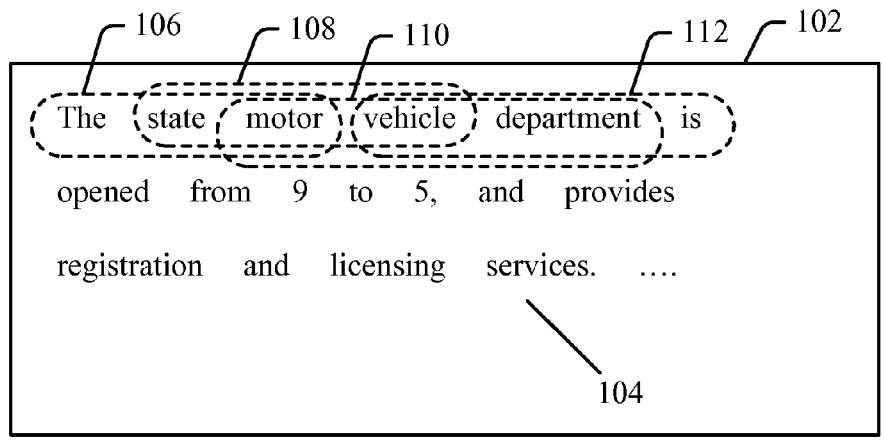
FIG. 1 is a block diagram of an example of how trigrams are counted in a document.

A statistical language model (SLM) has many applications in natural language processing. Examples of these applications include information retrieval, speech recognition, and natural language translation. An SLM is, in effect, a probability distribution function that defines the probabilities of occurrence of a set of N-grams. An N-gram is a sequence of N words for some fixed number N—e.g., a 3-gram (or "trigram") is a sequence of three consecutive words. A given SLM typically uses a particular value for N. For example, an SLM might have N=3, thereby defining the probabilities of occurrence of some set of trigrams. So, if we select a trigram at random from a body of text, the SLM can be used to predict the probability of selecting any particular trigram. For example, the SLM might assign the probability 0.00018 to the trigram "motor vehicle department." If so, then if we select a trigram at random from some text, the probability is 0.00018 (or 0.018%) that the sequence of words selected will be "motor vehicle department."

SLMs are typically constructed by analyzing existing text to determine how frequently particular N-grams occur in that text. For example, one can examine three-word windows of some body of text, and count how many times each distinct sequence of three words appears. Thus, suppose there is some body of text, and there are 100,000 different ways to position a three-word sliding window over that text. If we find that—of all the sequences of three consecutive words in the text—eighteen of them are the sequence "motor vehicle department," then we can say that the probability that the trigram "motor vehicle department" occurs in the text that we have examined is 18/100,000, or 0.00018. To the extent that the our observation about the text accurately describes other text that we have not yet analyzed, we can use this probability to predict the frequency with which the trigram "motor vehicle department" will occur in some other text.

But an issue that arises in this line of reasoning is that the observed rate at which N-grams occur in some text that we have already seen might, or might not, be an accurate representation of the rate at which specific N-grams will occur in some other text that we have not yet seen. In order to build an SLM of some very large corpus of text (e.g., the web), we would like to be able to state a probability for each N-gram based on the entire corpus, not merely for some subset of the corpus that we happen to have already observed and analyzed. However, for a very large corpus of documents, it is not feasible to analyze the entire set of documents at one time. Moreover, the content of some corpora of documents (e.g., those documents that make up the web) change over time, and thus the probability of each N-gram may change as the documents themselves change.

The subject matter described herein may be used to create an SLM, and to continually refine the SLM over time based on new data. In one example, an SLM is used to describe the content of the web. A web crawler examines web documents, and counts the occurrences of N-grams in those documents for some value of N (e.g., N=3). The web crawler recurrently reports on its findings. For example, the web crawler might examine 100,000 documents per day, and may report each day on the documents it has examined. Thus, in this example, every day the web crawler brings a fresh tally of which N-grams it has observed, how many times each of those N-grams has been observed, and the total number of N-grams that have been observed. The first time the web crawler returns this data, an SLM may be built based on the data. For example, in the course of examining 100,000 documents, the web crawler might examine 10,000,000 trigrams, of which 1,800 are the sequence "motor vehicle department." By dividing 1,800 by 10,000,000, we find that the probability of the sequence "motor vehicle department" is 0.00018. A similar calculation can be made for every other observed trigram in the documents that have been examined. On the first day this process is performed, there may be no existing SLM to combine this new data with, so an SLM is built based solely on the data returned by the web crawler. This SLM may be assigned a number (e.g., the ordinal number "first"), indicating that it is the first SLM.

The next day (or after some other period of time), the web crawler may return a report on the next 100,000 documents that it has examined. This report will likely have both similarities and differences to the previous report. Common trigrams may appear in similar proportion to what has already been observed. For example, the 100,000 documents examined on the second day may include 10,000,000 trigrams, of which 1750 are the sequence "motor vehicle department," yielding a probability of 0.000175—very similar to the 0.00018 that was calculated from the previous day's observations. However, the new data returned by the web crawler may have some differences. For example, some trigrams that were not found in any documents on the first day may be present in documents that were examined on the second day. Conversely, some trigrams that were found on the first day may not appear in any of the documents examined on the second day. Some trigrams that appear on both days may be observed to have very different frequencies in the different sets of documents. Thus, the initial (i.e., first) SLM contains some information about what N-grams exist in the web as a whole, but the data generated by the web crawler on the second day also contains some information about the content of the web as a whole. Thus, the subject matter herein seeks to blend these two pieces of information to create a new model that represents all of the information observed.

In order to perform this blending, the new data returned by the web crawler is analyzed to determine how well the current SLM predicts the frequency of trigrams observed in the new data. In effect, this analysis yields the posterior probabilities of the current SLM in view of the newly-observed data. This analysis may be distilled down to a probability, which may be labeled as $\pi$. In effect, there are two choices as to which model is correct: the current SLM, and the model that is built (or that can be built) from the count of N-grams returned today by the web crawler. Thus, $\pi$ represents the probability that the current SLM is correct. Therefore, the complement of $\pi$ represents the probability that the new data is correct. (If we use the statistical convention that probabilities of a sample space are assigned in such a way as to add up to one, then the complement of $\pi$ is $1-\pi$.) In order to combine the current SLM with the new data, a new SLM is created that is based on a weighted average of (1) the current SLM, and (2) the new data. In this weighted average, the current SLM influences the final average in proportion to $\pi$, and the new data influences the final average in proportion to $1-\pi$. This weighted average then becomes a new set of probabilities, which forms the basis for a new SLM. The new SLM is assigned a new ordinal number (e.g., second).

Each time the web crawler returns new information about the web, that information may be blended with the existing SLM to produce a new SLM—i.e., if the current SLM is the $i^{th}$ model, then the new data is blended with the $i^{th}$ model to produce the $(i+1)^{th}$ model. Over time, the model tends to converge on an accurate representation of the corpus of documents being analyzed (e.g., the web), while also reflecting changes in the content of that corpus over time. Moreover, the process tends to converge on an accurate representation of the corpus regardless of the starting point. For example, if the first SLM turns out to be based on aberrational data that produces a markedly wrong set of probabilities, over time the iterative process of refinement will overwhelm these wrong values with correct values, and the wrong values will have very little influence on the current model after a large number of iterative refinements. In other words, as long as the process starts with some SLM and continues to be refreshed by new data, after some number of iterations the model will accurately reflect the content of the corpus that it is attempting to describe.

The techniques described herein may be used to build an SLM for a large or changing body of data, such as the web. However, in general, the techniques herein may be used to build an SLM for any corpus of content, regardless of the size of that corpus, and regardless of whether the corpus evolves over time. For example, there may be a body of data that is not expected to change over time. The techniques described herein could be used to build an SLM for that data. The data could be divided into some number of sections (e.g., ten), and each of the ten sections could be fed into the process described herein. E.g., a first SLM could be built based on the first section. Then, the second section could be analyzed and the results of that analysis could be used to refine the first SLM, thereby producing a second SLM. And so on, until the tenth SLM is built. The tenth SLM would then be a model that describes the full body of data.

Turning now to the drawings, FIG. 1 shows an example of how trigrams are counted in a document. Document 102 is a text document, which contains some text 104 to be analyzed. For example, document 102 may be a typical Hypertext Markup language (HTLM) document of the type that appears on the web, and the HTML document may contain some text 104 that a web crawler would like to analyze. The web crawler may look at successive, overlapping N-grams in the document. In the example of FIG. 1, N=3, so the web crawler is examining trigrams. The example that follow may refer to the N=3 case (i.e., trigrams), although it will be understood that the subject matter herein is not limited to the use of trigrams, and anything described herein applies equally well to 2-grams, 4-grams, 5-grams, or N-grams with any value of N.

Example text 104 contains the sentence "The state motor vehicle department is opened from 9 to 5, and provides registration and licensing services." If it is assumed that a word is any sequence of characters that is surrounded by whitespace (or by the beginning or end of a document), then the first trigram is "The state motor" (block 106). The second trigram is "state motor vehicle" (block 108). The third trigram is "motor vehicle department" (block 110). The fourth trigram is "vehicle department is" (block 112). And so on. In the earlier running example, the trigram used is "motor vehicle department", which happens to be the three-word name of an entity. However, a trigram (or, in greater generality, an N-gram) does not have to be an entity name, but rather can be any sequence of words. For example, "vehicle department is" (block 112) is unlikely to be the name of an entity; it is just a sequence of words that happens to appear in text 104. Such a sequence is still a trigram, and the number of times that such a trigram occurs in text 104 can be counted.

After analyzing a set of documents such as document 102, a list of trigrams is produced, along with the number of times that each trigram appears in the set of documents. Implicitly, this information also includes the total number of trigrams. For example, if there are n different trigrams observed and $c_n$ is the number of times that the $n^{th}$ trigram has been observed, then the total number of trigrams is $\Sigma_{i=1}^{n} c_i$. Thus, for any trigram, it is possible to determine the proportion of trigrams in the set of documents as a whole that are equal to any one trigram. These proportions may be interpreted as probabilities in an SLM.

FIG. 2 shows an example representation of such an SLM, in which probabilities have been derived from the proportion that each trigram bears to the total number of trigrams. For example, in a given set of documents, there may be 10,000,000 trigrams observed, and 700 of these trigrams may be the sequence "deterministic finite automata." In that case, the trigram "deterministic finite automata" is assigned the probability 0.00007—i.e., if a random trigram is selected from this set of documents, the probability is 0.00007 that the one selected will be "deterministic finite automata." (Due to "smoothing", it may be the case that a given trigram is assigned a probability slightly different from the ratio of its occurrence count to the total number of trigrams. Smoothing avoids assigning non-zero probabilities to N-grams that have not been observed. Thus, some N-grams that have not been observed may be assigned non-zero probabilities, thereby slightly reducing the probabilities of N-grams that have been observed.)

Thus, statistical language model (SLM) 202 contains some example trigrams and their respective probabilities. As noted above, SLM 202 may be viewed as a probability distribution function, which associates a probability with a given trigram. Some example trigrams and their probabilities are shown in the drawing of SLM 202. For example, in addition to the probability of "deterministic finite automata" mentioned above, SLM 202 lists "probability density function" as having a probability of 0.00012, "motor vehicle bureau" as having a probability of 0.00071, and so on.

SLM 202 simplifies the description of probabilities by showing each observed trigram as a separate event. When implemented, SLM 202 would likely represent probabilities by a joint probability distribution function of N variables. For example, if trigrams are used, then SLM would be, in effect, a function of the form $W_1 \times W_2 \times W_3 \rightarrow \{p | 0 \le p \le 1\}$, where $W_1$, $W_2$, and $W_3$ are the first, second, and third words, respectively, in a given trigram, and p is the probability that sequence $W_1 | W_2 | W_3$ will occur. By defining the probability distribution function in this way, the SLM can be used to calculate conditional probabilities, which can be used to approximate the probability of an arbitrary sequence of words—even one that is longer than N. Thus, if SLM 202 is being used to analyze some input text and the words "motor" and "vehicle" have just been observed, it is possible to describe the probability that the word "department" will be observed next as $$P(W_3=\text{"department"}|W_1=\text{"motor"} \cap W_2=\text{"vehicle"}).$$

In other words, the expression above is the probability that "department" will be the next word, given that the previous two words were "motor" and "vehicle." These conditional probabilities can easily be calculated using normal principles of probability. For example, if the only words that can follow "motor vehicle" are "bureau", "department", and "office" (as shown in the simplified example of SLM 202), then we simply find the sum of the probabilities of the three sequences that begin with "motor vehicle" (0.00071+ 0.00082+0.00053=0.00206). Then, we divide the individual probabilities of each of those sequences by 0.00206, yielding the three conditional probabilities:

$$P(W_3=\text{"bureau"}|W_1=\text{"motor"} \cap W_2=\text{"vehicle"}) \approx 0.34$$

$$P(W_3=\text{"department"}|W_1=\text{"motor"} \cap W_2=\text{"vehicle"}) \approx 0.40$$

$$P(W_3=\text{"office"}|W_1=\text{"motor"} \cap W_2=\text{"vehicle"}) \approx 0.26$$

Using this technique, an N-gram-based SLM can approximate the probability of any arbitrary sequence of words. In the case where N=3, an SLM could be used to approximate the probability of the sequence of words $w_1, w_2, \ldots, w_n$ by the following equation:

$$P(w_1, \ldots, w_n) = P(w_1) \cdot P(w_2|w_1) \cdot P(w_3|w_1, w_2) \ldots P(w_n|w_{n-2}, w_{n-1})$$

Thus, a statistical language model may be viewed as defining the probability function that gives P(w|h)—i.e., the probability that the next word will be w, given that the history of words already seen is h. However, as the above discussion shows, the probability of w|h can be derived (or, at least, approximated) as long as the probability of any given N-gram is known. Thus, for the purpose of simplifying the description of SLMs, we will use the simplified model of SLM 202, in which an SLM defines the probability of each N-gram. It will be understood from the discussion above how these probabilities could be represented as a more formal joint probability distribution of N variables, and how conditional probabilities could be derived from such a distribution function.

Assuming that SLM 202 has been created and represents a set of probabilities associated with a set of trigrams, the techniques described herein may seek to blend some new information with the existing SLM. For example, SLM 202 may represent the probabilities of trigrams based on documents that have been analyzed so far. However, some new set of documents 204 may be analyzed (e.g., as a result of the web-crawling scenario discussed above, in which a web crawler analyzes some set of web documents every day). Based on the new set of documents 204, a new set of probabilities 206 may be created. As shown in FIG. 2, this new set of probabilities has some similarities with SLM 202, but also has some differences. For example, in probabilities 206 indicates that the trigrams "motor vehicle bureau" and "motor vehicle office" were observed in documents 204. In this sense, documents 204 are like the documents on which SLM 202 is based, since both sets of documents had those trigrams. However, the probabilities associated with those trigrams are different in documents 204 than in SLM 202. In particular, the trigram "motor vehicle bureau" was observed in documents 204 as having a 0.00046 probability, instead of the 0.00071 probability of SLM 202. Likewise, "motor vehicle office" has a 0.00061 probability in documents 204, instead of the 0.00053 probability in SLM 202. Additionally, some of the trigrams that appear in SLM 202—e.g., "motor vehicle department", "probability density function", and "deterministic finite automata"—were not observed in documents 204. Thus, the probabilities 206 derived from an analysis of documents 204 are somewhat different from the probabilities in SLM 202. The techniques discussed herein may be used to blend these two pieces of information to create a new SLM with a new set of probabilities.

Figure 3:
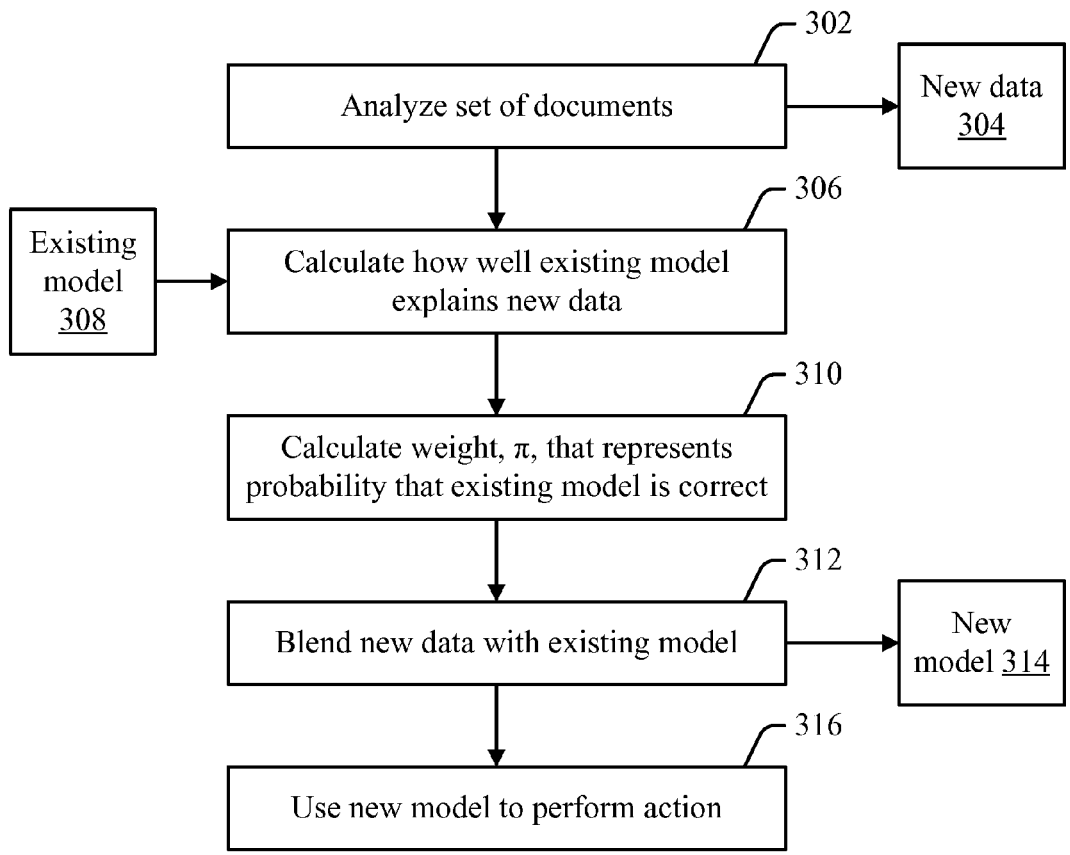
FIG. 3 is an example process of creating a new SLM from an existing SLM and a new set of data.

FIG. 3 shows an example process of creating a new SLM from an existing SLM and a new set of data. Before turning to a description of FIG. 3, it is noted that the flow diagrams of FIG. 3 is described, by way of example, with reference to components shown in FIGS. 1 and 2, although these processes may be carried out in any system and are not limited to the scenarios shown in FIGS. 1 and 2. Additionally, the flow diagram in FIG. 3 shows an example in which stages of a process are carried out in a particular order, as indicated by the lines connecting the blocks, but the various stages shown in this diagram can be performed in any order, or in any combination or sub-combination.

At 302, a set of documents is analyzed. For example, there may be some corpus of documents (e.g., the entire set of web documents), and the set of documents analyzed at 302 may be some subset of those documents. As noted above, a web crawler may be able to analyze some number of documents per day (e.g., 100,000), and the set of documents analyzed at 302 may be the set of documents that a web crawler was able to analyze on a given day. However, the set analyzed at 302 could be any set of documents. The result of the analysis performed at 302 is a new set of data 304, which describes how many times each N-gram appears in the set of documents as compared with the total number of N-grams. For example, data 304 may be the probabilities 206 (shown in FIG. 2), which describe how frequently each of a given set of N-grams was observed in some newly-analyzed set of documents.

At 306, a calculation is made of how well an existing model 308 explains the new data 304. For example, the existing model may be SLM 202 (shown in FIG. 2). Thus, at 306 it is determined how well existing model 308 explains new data 304. The following is a description of one way to perform that calculation.

Let $P^{(i)}$ (w|h) denote an existing model. The notation $P^{(i)}$ assumes that models are numbered in succession—i.e., that model i replaces model i-1, which replaced model i-2, and so on. Thus, $P^{(i)}$ denotes the $i^{th}$ model. ($P^{(i)}$ may be a "smoothed" model, in the sense that $P^{(i)}$ may be configured so as not to assign zero values to N-grams that have not yet been encountered—i.e., in a smoothed model, any N-gram can be assigned a positive probability.) The notion w|h, as discussed above, refers to the event that word w is observed next given that the sequence of words h has just been observed. (The symbol h stands for "history"; i.e., the words that have been observed before w are the "history.") As in the standard language of probability theory, the symbol "|" stands for "given"—i.e., P(w|h) means the probability that w will occur given that h has already occurred. Therefore, $P^{(i)}$(w|h) is a model that defines the probability that word w will follow the sequence of words h. As discussed above, the probability of w|h can be calculated or approximated as long as a probability can be associated with each N-gram. In FIG. 3, existing model 308 is $P^{(i)}$, and the action performed at 306 seeks to determine how well new data 304 is explained by $P^{(i)}$.

In order to make this determination, let $n_k$ denote the count of the $k^{th}$ N-gram observed in the newly-analyzed set of documents. That is, assume that, in the set of documents, A is the number of distinct N-grams have been observed, and the $k^{th}$ one of these A distinct N-grams has been observed $n_k$ times. Thus, the total number of N-grams observed in the documents is $M=\Sigma_k n_k$, and the probability of the $k^{th}$ N-gram is $$\frac{n_k}{M}.$$

Now, let $p_k$ be the probability of the $k^{th}$ N-gram, as predicted by the existing model $P^{(i)}$. It will be observed that, if a given N-gram is described as (w|h) (i.e., a particular word w, preceded by its history of N−1 words), then—by the definition of conditional probability—it is true that $p_k = P^{(i)}(w|h) \cdot P^{(i)}(h)$. If non-overlapping N-grams are assumed to be statistically independent from one another, then we can calculate how well the existing model already explains the data using the formula:

$$Pr = \frac{M!}{\prod_k n_k!} \prod_k p_k^{n_k}.$$

In this equation, Pr is an example of a quantity that represents how well the existing model predicts the N-grams observed in a newly-examined set of documents. Applying Stirling's approximation (ln M!≈M ln M−M), it is true that $$\ln Pr = \sum_k n_k \ln \frac{p_k}{n_k/M} = M \sum_k \frac{n_k}{M} \ln \frac{p_k}{n_k/M}.$$

Since $P_{ML}^{(i)}(w|h) = n_k/M$, we obtain $$\ln Pr \approx -M D_{KL}(P_{ML}^{(i)} \| P^{(i)})$$

where $D_{KL}$, (P||Q) denotes Kullback-Leibler (KL) divergence between the distributions P and Q. In terms of information theory, KL divergence describes the per-token differences of the information in the two distributions. One way to interpret the above equations involving the value Pr is to say that how well the smoothed model can account for the new data can be calculated by how much new information is discovered over all the M tokens in the newly observed data.

Using the above formulas, it is possible to calculate weight, π, which determines how much to count the existing model and the new data when deriving the new model (at 310 of FIG. 3). The following formula describes the factor π:

$$\ln \pi = \frac{1}{M} \ln Pr \approx -D_{KL}(P_{ML}^{(i)} \| P^{(i)}).$$

In this equation, $P_{ML}^{(i)}$ is a "maximum likelihood" model based on the frequency with which N-grams occur in the newly-analyzed data. ($P_{ML}^{(i)}$ may be an unsmoothed model, in the sense that it may assign zero probabilities to N-grams that do not occur in the newly-analyzed data.) Based on the above equation involving π, it is clear that π can be derived by raising e to the power of any of the expressions in the above equation.

Once π has been calculated, the new model may be calculated by blending the new data with the existing model (at 312). The blending may be performed according to the following formula:

$$P^{(i+1)}(w|h) = \pi^{(i)} P^{(i)}(w|h) + (1 - \pi^{(i)}) P_{ML}^{(i)}(w|h).$$

In this formula, The result of this formula is to produce a new model 314, denoted $P^{(i+1)}$ in the formula. What the formula says is that the $(i+1)^{th}$ model is based on an average of the current ($i^{th}$) model ($P^{(i)}$) and the new data ($P_{ML}^{(i)}$), where the ratio of (a) the influence of the current model to (b) the influence of the new data is π: (1−π). In the extreme case—i.e., where $P^{(i)}$ can fully predict the statistics of the new data—the KL divergence is 0, so $\pi = e^0 = 1$. In this case, the current model would be the only factor in determining the new model, since the newly-obtained data would provide no new information that is not already accounted for in the current model.

At 316, the new model is used to perform some action. One example of a tangible action that may be performed is to communicate, to a user, suggestions of phrase completions. E.g., if the user types the a sequence of words such as "motor vehicle" into the search box of a search engine, when these words are received the search engine can suggest queries such as "motor vehicle department", "motor vehicle bureau", etc., based on the probabilities of certain words ("department", "bureau", etc.) following the sequence "motor vehicle." Another example of a tangible action is to determine the relevance of a document to a query that has been entered by a user. For example, if the trigram "motor vehicle department" has a probability of 0.00082 in the web as a whole, but occurs with a 0.12 frequency in a given document, then that given document may be particularly relevant to a search on the query "motor vehicle department," and search results that are responsive to the query may be communicated to a user. Any type of action can be performed; the foregoing are merely some examples.

Figure 4:
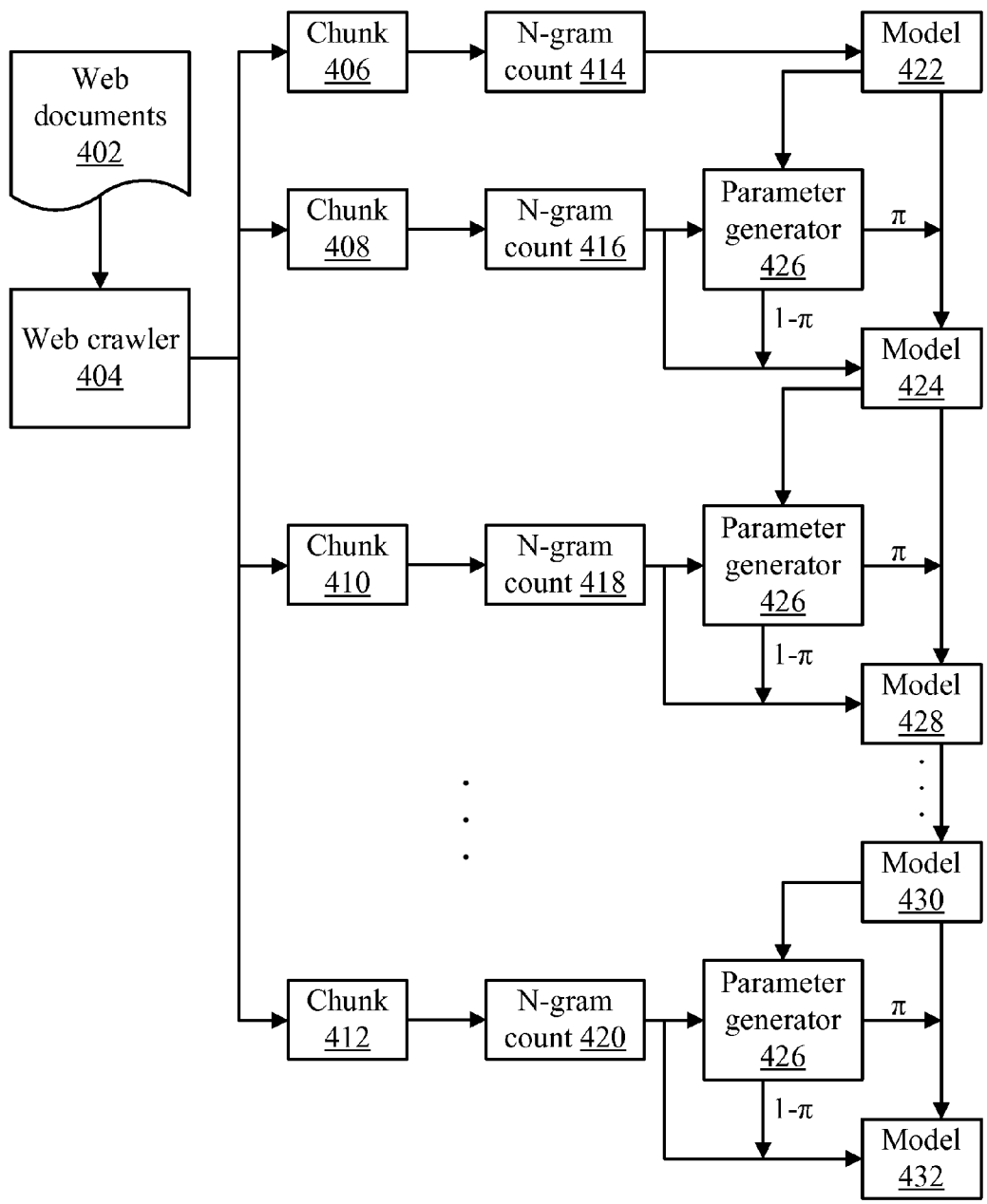
FIG. 4 is a block diagram of an example scenario in which the creation of an SLM is performed iteratively.

FIG. 4 shows an example scenario in which the creation of a model is performed iteratively. In the example of FIG. 4, it is assumed that the body of documents to be modeled is a set of web documents (possibly the whole web), although it will be understood that the use of web documents is merely an example. The techniques herein may be used on any type of information from any source.

In FIG. 4, a set of web documents 402 is examined by a web crawler 404. The documents are examined in portions or groups of documents called chunks. For example, one "chunk" of documents might be examined over the course of one day, and every night the web crawler might return the statistics on one particular chunk of documents. For example, chunks 406, 408, 410, and 412 might be chunks of the web that are examined by web crawler 404 on four particular days. For each of the chunks, a set of N-gram counts may be calculated. Each set of N-grams counts indicates the N-grams observed in a particular chunk, how many times the N-gram was observed, and the total number of N-grams observed in that chunk. In the example of FIG. 4, N-gram counts 414, 416, 418, and 420 are the counts for chunks 406, 408, 410, and 412, respectively.

The first chunk (chunk 406) is used to build a model 422. In the mathematical language described above, model 422 is $P^{(1)}$). Since there is no existing model before the first chunk is evaluated, model 422 is simply the frequencies with which each N-gram is observed (possibly smoothed to avoid assigning probabilities of zero to unseen N-grams). For example, if the model uses N=3 and if the trigram "motor vehicle department" is observed in 81 out of 100,000 trigrams, then "motor vehicle department" may be assigned a probability of 0.00081. Similar assignments can be made for all other trigrams. (Since smoothing assigns non-zero probabilities to unseen N-grams, some N-grams that are observed may be assigned probabilities lower than their actual frequency of occurrence—e.g., in the example above, "motor vehicle department" might be assigned a probability less than 0.00081, even it was observed in 81/100,000 N-grams.)

At some point, web crawler 404 returns chunk 408, with a corresponding set of N-gram counts 416. The information contained in N-gram counts 416 is then blended with the existing model 422 ($P^{(1)}$) to produce a new model 424 ($P^{(2)}$). Parameter generator 426 considers N-gram counts 416 and model 422. Using techniques described above, parameter generator 426 determines how well model 422 accounts for the new data represented by N-gram counts 416, and calculates a parameter it based on this determination. The weights it and 1−π are then applied existing model 422, and the probabilities represented by N-gram counts 416, respectively, using the formula for calculating $P^{(i+1)}$ described above. The resulting weighted average of these two pieces of information is model 424.

This process may be repeated each time new data is available. Thus, when chunk 410 is evaluated by web crawler 404, resulting in N-gram counts 418, parameter generator 426 may generate a new value of it based on how well model 424 explains the new N-gram counts 418. The information contained in N-gram counts 418 and the current model (model 424) may then be blended using a weighted average, to produce model 428 ($P^{(3)}$). The process may be repeated indefinitely, as indicated by the vertical ellipses in FIG. 4. For example, at some point model 430 ($P^{(n-1)}$) will be built by this process. Model 430 may then be blended with the $n^{th}$ chunk of data (chunk 412, corresponding to N-gram counts 420), to produce model 432 ($P^{(n)}$). From there, models $P^{(n+1)}$, $P^{(n+2)}$, etc., may be built, as long as new data continues to be available to refine the model.

Figure 5:
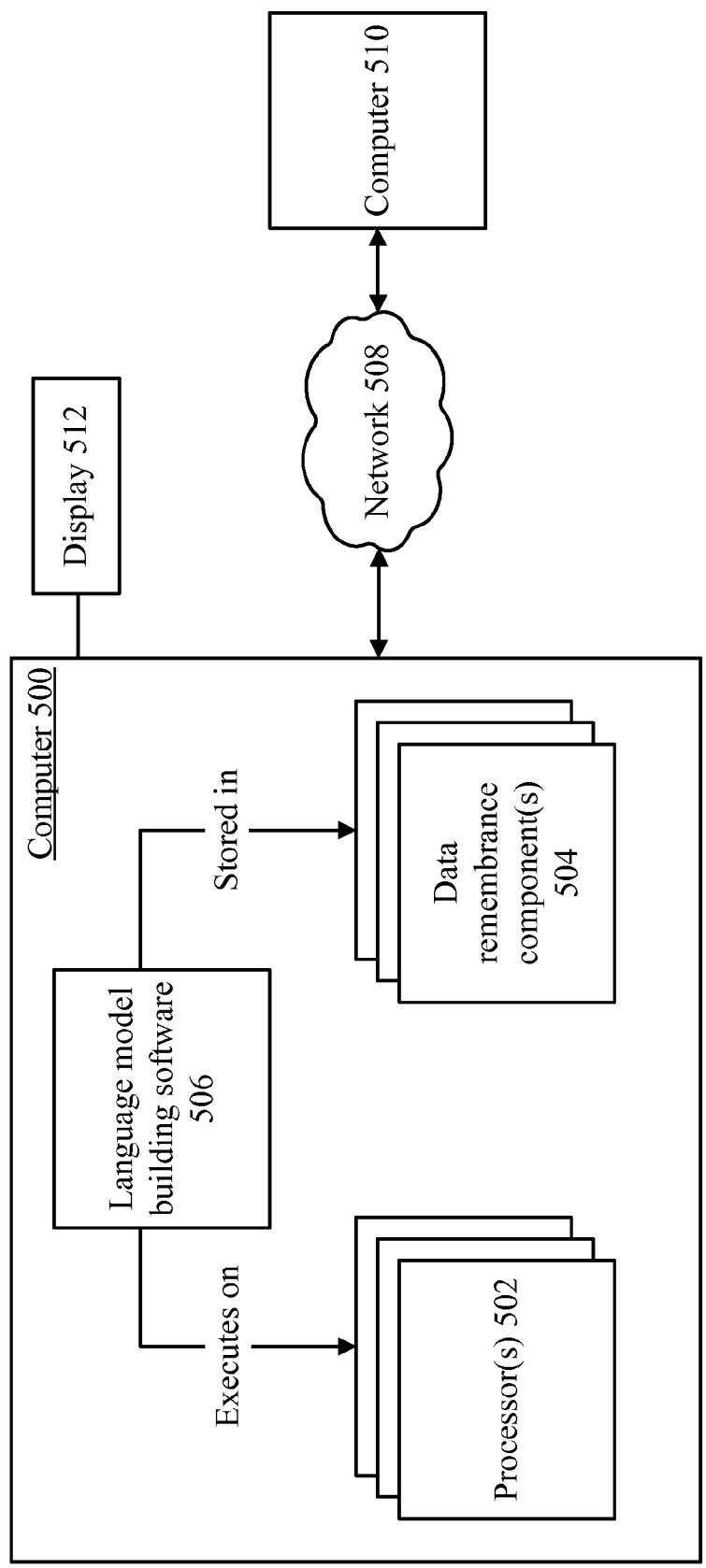
FIG. 5 is a block diagram of example components that may be used in connection with implementations of the subject matter described herein.

FIG. 5 shows an example environment in which aspects of the subject matter described herein may be deployed.

Computer 500 includes one or more processors 502 and one or more data remembrance components 504. Processor (s) 502 are typically microprocessors, such as those found in a personal desktop or laptop computer, a server, a handheld computer, or another kind of computing device. Data remembrance component(s) 504 are components that are capable of storing data for either the short or long term. Examples of data remembrance component(s) 504 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 500 may comprise, or be associated with, display 512, which may be a cathode ray tube (CRT) monitor, a liquid crystal display (LCD) monitor, or any other type of monitor.

Software may be stored in the data remembrance component(s) 504, and may execute on the one or more processor(s) 502. An example of such software is language model building software 506 (e.g., a language model builder), which may implement some or all of the functionality described above in connection with FIGS. 1-4, although any type of software could be used. Software 506 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 5, although the subject matter described herein is not limited to this example.

The subject matter described herein can be implemented as software that is stored in one or more of the data remembrance component(s) 504 and that executes on one or more of the processor(s) 502. As another example, the subject matter can be implemented as instructions that are stored on one or more computer-readable storage media. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 502) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 500 may be communicatively connected to one or more other devices through network 508. Computer 510, which may be similar in structure to computer 500, is an example of a device that can be connected to computer 500, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable memories or disks that store executable instructions to create a statistical language model, wherein the executable instructions, when executed by a computer, cause the computer to perform acts comprising:

using a web crawler to collect a set of documents;

analyzing text in said set of documents to determine a set of probabilities associated with sequences of words in said documents;

receiving a first statistical language model into a memory of said web crawler, said statistical language model comprising, for each N-gram in said language, a probability that said N-gram occurs in a document;

using said web crawler to calculate a quantity that represents how well said first statistical language model predicts occurrence of said sequences of words in said documents, said calculating of said quantity being performed by retrieving said statistical language model from said memory and using a processor to multiply probabilities of N-grams in said statistical language model to produce a first product, to multiply counts of said N-grams in said documents to produce a second product, and to divide said first product by said second product;

using said web crawler to calculate a weight based on said quantity;

using said web crawler to create a second statistical language model by using said weight to blend said first statistical language model with said set of probabilities, M being a number of N-grams in said set of documents, said calculating of said weight comprising:
  calculating a divergence between a probability distribution represented by said first statistical language model and a probability distribution represented by said set of probabilities; and
  raising a number to a power that is based on said divergence;
receiving text entered by a user; and
using said second statistical language model to present, on a display device of said computer, suggested phrases that begin with said text entered by said user.

2. The one or more computer-readable memories or disks of claim 1, further comprising:
  using said second statistical language model to evaluate a search query entered by said user, and to communicate to said user, in tangible form, a set of search results that are responsive to said query.

3. The one or more computer-readable memories or disks of claim 1, further comprising:
  receiving a first sequence of one or more words from said user; and
  using said second statistical language model to communicate, in tangible form, one or more second sequences of words to said user, wherein each of said second sequences of words begins with said first sequence of words.

4. The one or more computer-readable memories or disks of claim 1, wherein said first statistical language model and said second statistical language models are smoothed models.

5. The one or more computer-readable memories or disks of claim 1, said acts further comprising:
  recurrently creating new statistical language models by recurrently analyzing text in new sets of documents and using weights to blend each successive new statistical language model with a previous statistical language model.

6. The one or more computer-readable memories or disks of claim 1, said N-grams being trigrams.

7. The one or more computer-readable memories or disks of claim 1, said set of documents comprising web documents.

8. A method of creating a language model, the method comprising:
  using a processor to perform acts comprising:
    using a web crawler to collect a set of documents;
    analyzing text in said set of documents to determine a set of probabilities associated with N-grams observed in said set of documents;
    using said web crawler to calculate a first quantity that represents how well a first statistical language model predicts occurrence of said N-grams in said set of documents;
    using said web crawler to calculate a second quantity based on said first quantity;
    using said web crawler to create a second statistical language model based on said second quantity, said first statistical language model, and said set of probabilities, M being a number of N-grams in said set of documents, and said calculating of said second quantity comprising:
      calculating a divergence between a probability distribution represented by said first statistical language model and a probability distribution represented by said set of probabilities; and
      raising a number to a power that is based on said divergence;
    receiving text entered by a user; and
    using said second statistical language model to present, on a display device, suggested phrases that begin with said text entered by said user.

9. The method of claim 8, wherein said acts further comprise:
  using said second statistical language model to evaluate a search query entered by said user, and to communicate to said user, in tangible form, a set of search results that are responsive to said query.

10. The method of claim 8, wherein said acts further comprise:
  receiving a first sequence of one or more words from said user; and
  using said second statistical language model to communicate, in tangible form, one or more second sequences of words to said user, wherein each of said second sequences of words begins with said first sequence of words.

11. The method of claim 8, wherein said first statistical language model and said second statistical language models are smoothed models.

12. The method of claim 8, said acts further comprising:
  recurrently creating new statistical language models by recurrently analyzing text in new sets of documents and using weights to blend each successive new statistical language model with a previous statistical language model.

13. The method of claim 8, said N-grams being trigrams.

14. The method of claim 8, said set of documents comprising web documents.

15. A system for creating a language model, the system comprising:
  a processor;
  a data remembrance component;
  an input device;
  a display device;
  a web crawler that collects a set of documents, that evaluates said documents and that counts occurrence of N-grams in said documents, that creates data indicating counts of N-grams in said documents, that is configured to indicate counts of N-grams in a first set of documents, wherein said web crawler is configured to create a quantity indicating how well a first statistical language model predicts counts of N-grams in said first set of documents, and is configured to create a second statistical language model based on a first probability distribution in said first statistical language model, a second probability distribution based on N-gram counts of said first set of documents, and said quantity, M being a number of N-grams in said first set of documents, said web crawler being configured to create said quantity by calculating a divergence between said first probability distribution and said second probability distribution, and by raising a number to a power that is based on said divergence; and
  a text receipt component that is stored in said data remembrance component, that executes on said processor, that is configured to receive text entered by a user, and that is configured to use said second statistical language model to present, on said display, suggested phrases that begin with said text entered by said user.

16. The system of claim 15, wherein a component of said system uses said second statistical language model to evaluate a search query entered by said user, and communicates to said user, in tangible form, a set of search results that are responsive to said query.

17. The system of claim 15, wherein a component of said system receives a first sequence of one or more words from said user and uses said second statistical language model to communicate, in tangible form, one or more second sequences of words to said user, wherein each of said second sequences of words begins with said first sequence of words.

18. The system of claim 15, said web crawler recurrently creating new statistical language models by recurrently analyzing text in new sets of documents and by using weights to blend each successive new statistical language model with a previous statistical language model.

19. The system of claim 15, said N-grams being trigrams.

20. The system of claim 15, said documents comprising web documents.

* * * * *